Sept. 23, 1969      P. I. KRASNOW ET AL      3,468,710

SEA WATER BATTERY

Filed Feb. 16, 1966

INVENTORS
PHILIP I. KRASNOW
JEROME GOODMAN
BY Amster & Rothstein
ATTORNEYS ical current. More particularly, the invention is directed to an improved component for use in a battery of air or oxygen depolarized cells of the type described in commonly assigned Oswin application Ser. No. 427,623 filed Jan. 25, 1965, now abandoned, and Rosansky application Ser. No. 517,604 filed Dec. 30, 1965, now U.S. Patent No. 3,378,406. The improved component performs the dual function of cell spacer and heat dissipator.

United States Patent Office 3,468,711
Patented Sept. 23, 1969

3,468,711
METAL-OXYGEN FUEL CELL
Bruce Jagid, Whitestone, and Martin G. Rosansky, Forest Hills, N.Y., assignors to Leesona Corporation, Warwick, R.I., a corporation of Massachusetts
Filed Mar. 15, 1966, Ser. No. 534,376
Int. Cl. H01m 29/04
U.S. Cl. 136—86                                    18 Claims

ABSTRACT OF THE DISCLOSURE

A metal/air or oxygen battery comprising an outer housing; a plurality of electrochemical cells each containing an envelope cathode, a metal anode positioned within said envelope cathode and an electrolyte in the space separating the anode and cathode, and inter-cell spacers between and in contact with adjacent cells with the inter-cell spacers being heat-conductive and constructed and/or shaped to permit air or oxygen to pass to said plurality of cells through openings therein or through air passages defined by the shape of said spacers is described.

---

Figure 1:
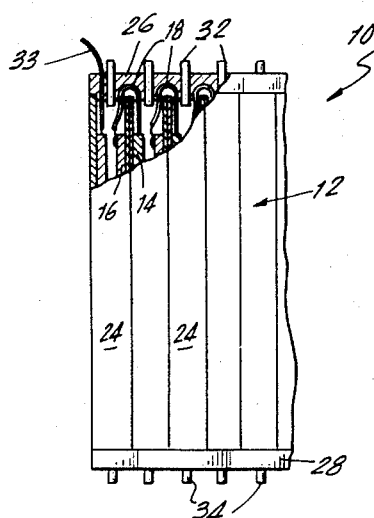
Figure 2:
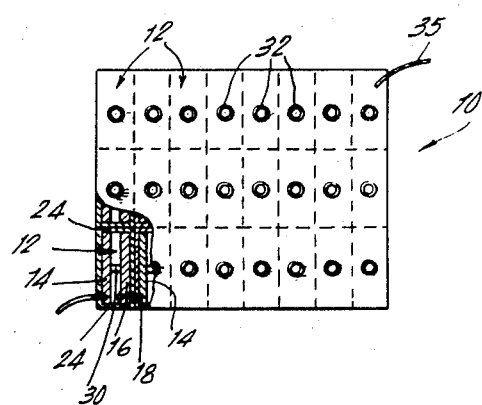

This invention relates to an improvement in air or oxygen depolarized cells for the electrochemical generation of electrical current. More particularly, the invention is directed to an improved component for use in a battery of air or oxygen depolarized cells of the type described in commonly assigned Oswin application Ser. No. 427,623 filed Jan. 25, 1965, now abandoned, and Rosansky application Ser. No. 517,604 filed Dec. 30, 1965, now U.S. Patent No. 3,378,406. The improved component performs the dual function of cell spacer and heat dissipator.

The metal/air or metal/oxygen primary or secondary electrochemical batteries described in the aforesaid Oswin and Rosansky co-pending applications permit a compact battery construction to provide a high energy to density ratio and have a rapid rate of discharge and charge. As a result of the aforesaid, the battery has application as a source of power for communication units and vehicles in field operation and in space systems. Essentially, the batteries comprise a plurality of metal/air or metal/oxygen cells, each cell including a cathode, an anode, and an electrolyte between the anode and cathode. Preferably, the electrolyte is contained in a suitable matrix which can be integral with the anode or cathode. The cathode is made up of a hydrophobic polymer membrane such as polytetrafluoroethylene which is gas permeable, but impermeable to liquids with a catalytic layer thereon which is in contact with the electrolyte of the cell. In operation, air or oxygen passes through the polymer membrane, ionizes at the catalytic layer, accepting electrons and forming hydroxyl ions which are transferred to the anode to complete the electrochemical reaction. A representative reaction where zinc is employed as the anode and the cell fed with oxygen is as follows:

At the cathode

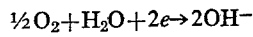

At the anode

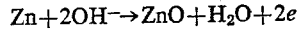

Total cell reaction

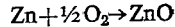

It is essential for operation, as seen from the above reactions, that the cathode of the cell be accessible to air or oxygen. The aforesaid Rosansky application which utilizes a plurality of the cells described by Oswin teaches inter-cell spacers which are highly porous, permitting access of air between the individual cells and to the cathodes while at the same time permitting compact construction. The inter-cell spacers of Rosansky are preferably highly porous, flexible plastic members.

Although the multi-cell batteries are desirable, particularly from the standpoint of their high energy to density ratio, it has been found that particularly in enclosed surroundings, as for example in space units, substantial quantities of heat are produced as a by-product of the electrochemical reaction. For efficient operation, the heat generated must be removed from the immediate environment of the cell.

Accordingly, it is an object of the present invention to provide an improved inter-cell spacer which permits access of air or oxygen to the cathodes and, further, functions as the heat dissipator.

It is another object of this invention to provide metallic inter-cell spacers for use in compact metal/air or metal/oxygen battery construction, which spacers have good heat conductive properties.

It is another object of this invention to provide a multi-cell battery stack including inter-cell spacers for maintaining said multi-cells in operable association, permitting access of air to the oxygen cathode and, further, permitting rapid removal of heat from the environment of the cells.

These and other objects of the invention will become more readily apparent from the following detailed description, with particular emphasis being placed upon the drawing.

The aforesaid objects of the present invention are accomplished by utilizing metal, corrugated inter-cell spacers which extend from the first inner surface of the battery casing to the second inner surface. Preferably, the spacers are in actual contact with the battery housing. When the cells of the battery are placed in operable association, heat which is generated within the cell is removed by conductance from the cathode surface to the battery casing where it is dissipated.

The basic advantages resulting from the assembly are: (1) heat removal is a function of the inter-cell spacers which are required for proper oxygen and/or air flow to the cells; (2) heat is removed at the point of generation (cathode surface) preventing hot spots in the cells; (3) heat removal is by conduction which is the simplest and most rapid mode of heat removal available in a battery system; and (4) a more complex heat removal system, necessitating more bulk and added weight in the battery, thereby reducing the available net power, is avoided.

The improved battery construction utilizing the present inter-cell spacers will be more readily apparent from the following detailed discussion with reference to the drawing which illustrates a battery of cells with the outercasing and cover of the battery partially broken away to show the interior construction. In the drawing, like numerals are employed to designate like parts throughout.

Referring more specifically to the drawing, reference numeral 10 is directed to the complete battery comprising outercasing 1 having cover unit 1.1. A number of individual cells 2 are mounted within the housing and separated by inter-cell spacers 3. The cells are electrically connected in series or parallel by contacts 2.1 and 2.2. End plates, not shown, are optional at either end of the cell stack, positioned away from the adjacent cell by means of inter-cell spacer 3.

Inter-cell spacer 3 which functions as the heat dissipator according to this invention comprises a corrugated metal structure having openings therein to permit access of air or oxygen to the cathodes. The inter-cell spacers will extend from inner surface to inner surface of the battery housing. When the components of the battery are in operable association, the spacers are pressed against the bi-cathodes permitting rapid heat removal by means between. A plurality of tubes 32 and 34 mounted in any appropriate manner in the cover plate 26 and base plate 28 function as means for initially introducing the sea water electrolyte into the battery 10 and for later flushing this sea water with the chemical reaction by-products from the battery. Completing the battery 10 are the usual main battery leads 33 and 35 for connecting the battery to appropriate circuitry.

Figures 3, 4:
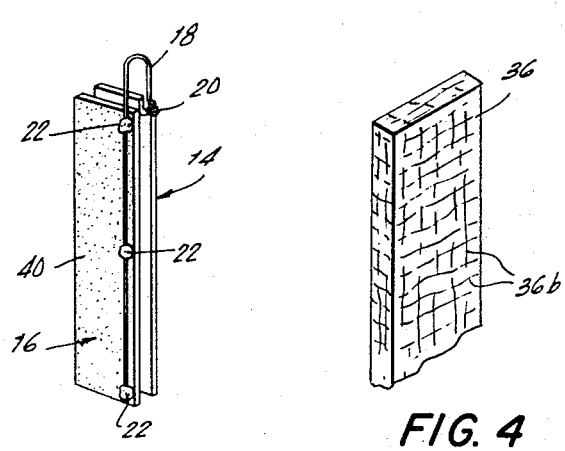

In a sea water battery as is exemplified by the battery 10 just described, use can effectively be made of a magnesium-lead chloride couple despite the fact that lead chloride inherently lacks the strength to withstand the abuse of normal use if a sea water battery. This is achieved in accordance with the present invention by combining the lead chloride with a fibrous body 36 such as is diagrammatically illustrated in FIG. 4. A particularly suitable fibrous material for the fibrous body 36 is a product sold under the trademark "Fiberfrax" by Union Carbide of New York, N.Y. and consisting of fibers of silicon dioxide and aluminum oxide. These materials, like asbestos and other such materials, are well known for their resistance to comparatively high temperature. Additionally, because of its fibrous nature, the body 36, due to capillary action as well as to inherent characteristics of the materials possesses a high degree of absorbency for liquids which, as will soon be apparent, is used to advantage to achieve the combination of this material with the lead chloride.

Figure 5:
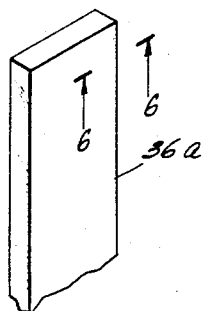

Starting with a fibrous body 36 having the attributes of being able to withstand comparatively high temperatures without disintegration and also having a relatively high degree of absorbency, the mechanical combination of this material with lead chloride to produce an acceptable embodiment of a cathode in a sea water battery, as is exemplified by the lead chloride cathode electrode 16 hereof, is achieved by dipping or otherwise placing the fibrous body 36 in contact with molten lead chloride which in the molten state is at a temperature of about 1000° F. However, because of the inherent resistance of the materials of construction of the fibrous body 36 to such high temperatures no adverse effect results. Upon contact, however, of the fibrous body 36 with the molten lead chloride, the lead chloride is absorbed within the body, and more particularly into the spaces, collectively designated 38, which exists between the fibers (see FIG. 6). This results in the transformation of the fibrous body 36 into a solid bar or block 36a, such as is shown in FIG. 5, which has sufficient strength to withstand considerable abuse and stress as occurs during normal use of a typical sea water battery.

Figure 6:
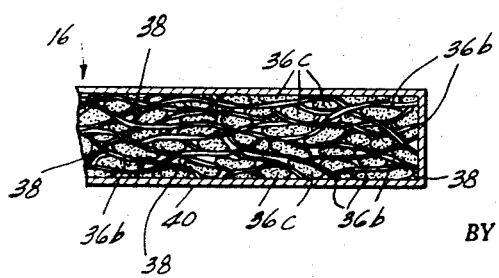

As is best shown diagrammatically in FIG. 6, the transformed body 36a, when viewed under highly magnified conditions, includes a mass or network of fibers, herein collectively designated 36b, and a plurality of solidified particles or bodies of lead chloride, collectively designated 36c in areas which previously were the spaces 38b. This resulting structure of fibers 36b and lead chloride particles 36c in turn results in the network of fibers 36b providing support to the solidified lead chloride particles 36c. Additionally, the location of the lead chloride particles 36c inwardly of the surfaces of the transformed body 36a provides sufficient protection against breakage thereof and other manifestations of the fragile nature of this material with the result that it has been found that the transformed body 36a is entirely satisfactory for use in a sea water battery.

For reasons which are well understood, it is desirable to start the chemical reaction at the cathode electrode by using a pure lead material, and in accordance with the present invention this is preferably done by applying a surface coating of lead 40 to the transformed body 36a. One convenient way in which this is achieved is by painting the transformed body 36a with any conventional paint having a usual high content of lead.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A sea water battery cathode electrode of a predetermined extent comprising the combination of an absorbent, porous body of an extent equal to that of said cathode electrode consisting of fibers having a resistance to comparatively high temperatures, said fibers having an operative arrangement throughout said body such that adjacent fibers bound plural spaces throughout said body, and lead chloride supported in said plural spaces of said body, said lead chloride being absorbed within said plural spaces while the porous body is in a molten bath of said lead chloride.

2. An electrode for a sea water battery as defined in claim 1 including a conductive surface coating of lead to facilitate the start of the chemical reaction at said electrode.

3. An electrode for a sea water battery as defined in claim 1 wherein said fibers are fabricated of silicon dioxide and aluminum oxide.

References Cited

UNITED STATES PATENTS

| 2,577,936 | 12/1951 | Waggoner | 65—3 |
| 3,268,312 | 8/1966 | Grant | 65—3 |
| 3,223,556 | 12/1965 | Cohn et al. | 136—86 |
| 3,259,522 | 7/1966 | Voss et al. | 136—27 |
| 3,309,228 | 3/1967 | Dodson et al. | 136—26 |

OTHER REFERENCES

"Storage Batteries," 3rd edition, John Wiley & Sons, Inc., pp. 21 and 31.

WINSTON A. DOUGLAS, Primary Examiner

C. F. LEFEVOUR, Assistant Examiner

U.S. Cl. X.R.

136—120